United States Patent [19]

Florence et al.

[11] Patent Number: 5,523,881

[45] Date of Patent: Jun. 4, 1996

[54] OPTICAL CORRELATOR USING LIGHT PHASE MODULATION AND TWO REFLECTIVE SPATIAL LIGHT MODULATORS

[75] Inventors: James M. Florence, Richardson; R. Mark Boysel, Plano, both of Tex.

[73] Assignee: Texas Instruments Incorporated, Dallas, Tex.

[21] Appl. No.: 486,126

[22] Filed: Jun. 7, 1995

Related U.S. Application Data

[60] Continuation of Ser. No. 201,307, Feb. 24, 1994, which is a division of Ser. No. 862,933, Apr. 3, 1992, Pat. No. 5,312,513.

[51] Int. Cl.$^6$ ............................. G02B 27/46; G06K 9/64
[52] U.S. Cl. ................. 359/561; 382/278; 382/280; 364/822; 364/827; 359/560; 359/29
[58] Field of Search ................ 359/306, 243, 359/560, 561, 290, 291, 292, 847, 849, 1, 29, 107, 108; 364/210, 211, 278, 279, 280, 822, 826, 827, 819, 713; 382/211, 212, 209, 276, 278, 280

[56] References Cited

U.S. PATENT DOCUMENTS

| | | | |
|---|---|---|---|
| 4,633,427 | 12/1986 | Bocker | 364/822 |
| 4,800,519 | 1/1989 | Grinberg et al. | 364/822 |
| 5,024,508 | 12/1991 | Horner | 364/822 |
| 5,061,049 | 10/1991 | Hornbeck | 359/224 |
| 5,083,857 | 1/1992 | Hornbeck | 359/291 |
| 5,136,413 | 8/1992 | MacDonald et al. | 359/213 |
| 5,148,157 | 9/1992 | Florence | 359/318 |
| 5,148,496 | 9/1992 | Anderson | 359/561 |
| 5,151,814 | 9/1992 | Geinbert et al. | 359/209 |
| 5,187,487 | 2/1993 | Riza | 359/238 |
| 5,214,534 | 5/1993 | Kallman et al. | 359/561 |
| 5,276,636 | 1/1994 | Cohn | 364/822 |
| 5,285,308 | 2/1994 | Jenkins et al. | 359/260 |
| 5,287,215 | 2/1994 | Warde et al. | 359/291 |

OTHER PUBLICATIONS

"Complex Spatial Filtering with Binary Masks", Brown et al., Applied Optics Jun., 1966, vol. 5, No. 6, pp. 967–969.
"Implementation of ternary phase amplitude filters using a magnetopic spatial light modulator", Kast et al, App. Opt., vol. 28, No. 6, Mar. 1989, pp. 1044–1046.
"Quad–Phase–Only Filter Implementation", Hansche et al., Applied Optics, vol. 28, No. 22, Nov., 1989, pp. 4840–4844.
"Phase–Only Modulation Using Twisted Nematic Liquid Crystal Television", Barnes et al., Applied Optics, Vo. 28, No. 22, Nov., 1989, pp. 4845–4852.

*Primary Examiner*—William L. Sikes
*Assistant Examiner*—Kenneth Parker
*Attorney, Agent, or Firm*—Brian C. McCormack; James C. Kesterson; Richard L. Donaldson

[57] ABSTRACT

An optical signal processor which employs a coherent light source, two spatial light modulators and a beam splitter. Light is from the source is reflected from the beam splitter and sent to a first spatial light modulator, then sent through the beam splitter, a Fourier transform is performed and the transformed light is then reflected from the second spacial light modulator. The light form the second spacial light modulator is then inverse transformed and returned to the beam splitter where it is reflected to a readout detector. The signal read out is the correlation map between an input image from the first modulator and a filter image of the second modulator.

12 Claims, 10 Drawing Sheets

OPTICAL CORRELATOR USING LIGHT PHASE MODULATION AND TWO REFLECTIVE SPATIAL LIGHT MODULATORS

This is a Continuation of application Ser. No. 08/201,307, filed Feb. 24, 1994; which is a Divisional application Ser. No. 07/862,933 filed Apr. 3, 1992 now U.S. Pat. No. 5,312,513.

FIELD OF THE INVENTION

This invention generally relates to multiple phase spatial light modulation, and more specifically to the operation and fabrication of a light modulator that is addressed by discrete level address circuitry but is capable of multiple phase states for light modulation.

BACKGROUND OF THE INVENTION

Spatial light modulators (SLM) are transducers that modulate incident light in a spatial pattern corresponding to an electrical or optical input. The incident light may be modulated in its phase, intensity, polarization, or direction, and the light modulation may be achieved by a variety of material exhibiting various electrooptic or magnetooptic effects and by materials that modulate light by surface deformation. SLM's have found numerous applications in the areas of optical information processing, projections displays, and electrostatic printing. See references cited in L. Hornbeck, 128×128 Deformable Mirror Device, 30 IEEE Tran. Elec. Dev. 539 (1983).

Heretofore, in this field, a number of methods have been applied to achieve more than two phase and/or amplitude states in binary light modulators. Virtually all of these have been applied to magnetooptic modulators which are inherently binary but some can be applied to other modulators that are simply run in a binary fashion. Flannery et al., "Transform-ratio Ternary Phase-amplitude Filter Formulation for Improved Correlation Discrimination", Applied Optics 27, 4079–4083 (1988) and Kast et al., "Implementation of Ternary Phase Amplitude Filters Using a Magnetooptic Spatial Light Modulator", Applied Optics 28, 1044–1046 (1989) have described methods of using a ternary state that can be accessed in a magnetooptic modulator. Magnetooptic devices operate by switching the direction of the magnetic domain in a transmissive garnet material. The domain direction can have only two states which leads to the inherently binary nature of the device.

A major disadvantage of the binary holograms and filters is that the binary representation is identical for both a hologram (or filter) and its complex conjugate. This means that when a binary hologram is reconstructed, both the desired image and a spatially reversed copy of the image (flipped in both the horizontal and vertical directions) are produced. Since neither the image nor its conjugate are preferred in this reconstruction, the total energy in the output is divided equally between the images reducing the efficiency of the process. In addition, the two reconstructions will overlap each other spatially unless special techniques such as spatial carriers are employed to separate these two images. Spatial carrier modulation will further reduce the overall efficiency of the reconstruction process.

Dickey and Hansche, "Quad-phase Correlation Filter Implementations", Applied Optics 28, 4840–4844 (1989) have described a method of using a binary state magnetooptic device to achieve four phase levels for correlation filters. The method uses a detour phase approach by operating the device aligned slightly off axis. The tilt used to give this misalignment provides a $\pi/2$ phase difference between adjacent pixels in the modulator in the tilt direction. By setting the processing resolution such that the responses from adjacent pixels mix together to give the net response, four phase states are possible: $(\pm 1 \pm j)/\sqrt{2}$, (i.e., $\pi/4$, $3\pi/4$, $5\pi/4$, and $7\pi/4$ radians). The technique requires critical alignment tolerances.

In U.S. Ser. No. 590,405 filed Sep. 28, 1990, Florence has shown that full complex light modulation is possible by mixing the response of two adjacent phase modulating elements with analog addressing. The separate addressing of the two modulating elements provides the two degrees of freedom required to independently set both amplitude and phase in the combined pixel response. Although this method is quite general and provides complete modulation range in both amplitude and phase, it requires analog addressing circuitry.

SUMMARY OF THE INVENTION

The preferred embodiment of the present invention in large measure overcomes the aforementioned difficulties. The preferred embodiment provides for reprogrammable methods for image filtering, correlation, reconstruction of holographic images, and information or detail enhancement using complex modulation in the Fourier plane. The preferred embodiment of the present invention provides for phase-only modulation having greater optical efficiency than full complex modulation, since no light is removed by amplitude attenuation. The preferred embodiment further utilizes the advantages of binary addressing circuitry which requires significantly less memory for filter storage relative to an analog phase representation and is also substantially simpler to manufacture and operate than one which must provide specific analog addressing levels.

The preferred embodiment also provides for multiple phase levels for complex modulation, and further provides for a zero amplitude state. The advantage of having a zero amplitude state is that in certain regions of the filter plane, noise can be removed where very little or no signal energy will be lost. Thus, signal-to-noise ratios can be improved with little effect on optical efficiency.

The preferred embodiment further accomplishes the aforementioned advantages without the critical alignment difficulties mentioned in the prior art devices.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
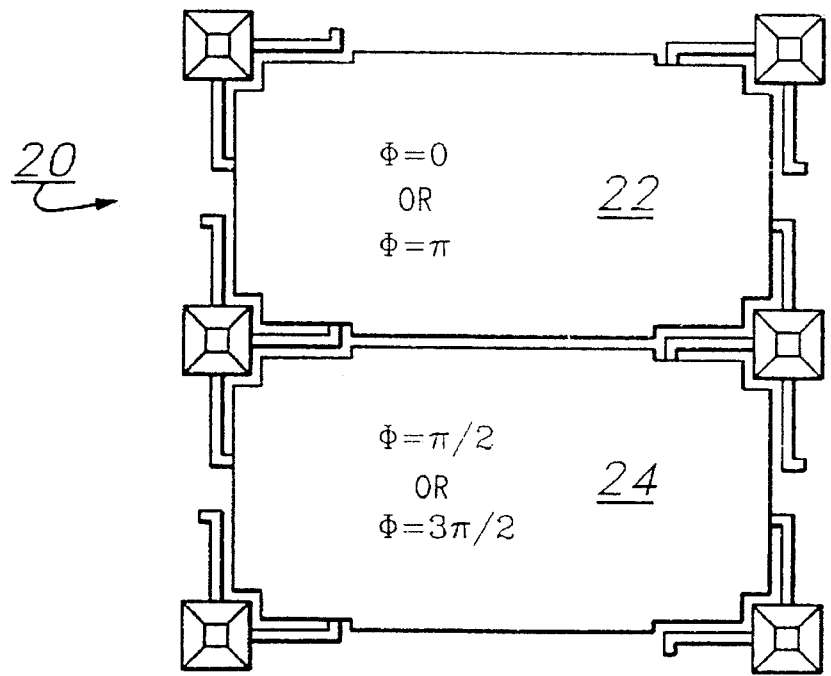
FIG. 1 is a plan view of a preferred embodiment two element Multiple Phase Spatial Light Modulator (MPSLM).

In the field of signal processing, modulation generally refers to the process of varying the amplitude, frequency, or phase of a carrier signal. The unmodulated carrier signal is a wave of energy of constant frequency. This energy may be sound, light, or radio waves. The important feature of energy waves is that, although sometimes they may be conducted through matter, it is only the energy itself that moves. When a stone is dropped into a pond, for example, the ripples spread out from the point where the stone hits the water. These waves, however, are not made up of water traveling outward. Instead, the water at the surface of the pond just rises and falls, and only the energy moves outward. In the same way, light or sound waves consist of a regular rise and fall of energy. The distance between successive energy rises is the wavelength, the rate at which they pass is the wave's frequency (in music, the frequency is the same as the pitch of the sound), the difference between their high and low energy states is their amplitude, and the condition of the wave in a single moment and place in time is its phase (in other words, there are 360 degrees or $2\pi$ radians of phase between successive energy rises—180 degrees or $\pi$ radians of phase between an energy maxima and an energy minima). In traveling to us and through us, waves may bring not just energy but also communicate meaning. Waves that are constant, for example as in the beam of a flashlight, cannot convey any information. But if that beam is interrupted, or if its brightness can be made to change, then it can carry a message. This is how all wave-borne communications work.

Amplitude modulation is analogous to a trombonist playing a constant note or pitch, but varying the volume of the sound of the trombone. Frequency modulation is analogous to a trombonist playing a constant pitch, but oscillating the slide of the trombone about the position corresponding to the constant, unmodulated pitch—resulting in a vibrato or a sound which tremors about the constant pitch. The sound of a trombone many feet away travels to the audience in generally planar waves—surfaces of equal energy travelling at an equal speed away from the trombone. Listeners at equal distances from the trombone would receive the sound in the same phase. If the signal had to travel slightly further, or was made to travel slightly more slowly to one listener than the other, than they would receive the sound in a different phase. Although the human ear generally cannot detect phase differences and the trombonist is incapable of modulating the phase as he did with the amplitude and frequency, various electronic devices can transmit and detect these phase differences in an analogous manner. In the same manner as the trombonist, information can be transmitted by modulating a constant frequency, or carrier, signal of light and imparting and detecting changes of amplitude, frequency and phase. The preferred embodiment of the present invention is capable of doing this with the phase of light signals. In the preferred embodiment, a laser light (which has an approximately constant frequency, and wavefronts of nearly uniform phase) shines onto an array of Spatial Light Modulators (SLM). Information is put on this array, typically by a computer, and is now a part of the light signal which is reflected from the preferred embodiment invention. The preferred embodiment of the present inventions modulates the continuously varying phase of the incident light, and induces discrete phase changes depending on the information which is being transmitted. Just as time is continuous, as can be seen in the movement of a clock's second hand, so is the phase of a light signal. Time is measured, however, in discrete units: hours, minutes, seconds, and portions of seconds. The more sub-units (¼, ½, ¾ hours vs. ⅛, ¼, ⅜, ½, ⅝, ¾, ⅞ hours) a unit (hour) can be broken into, the more accurately the representation of time can be made. The same is true with phase of a signal, so the preferred embodiment of the present invention makes it possible to break the phase easily into sub-units while still using digital signals, typically binary addressing signals, such as those from a typical computer. By using individually addressed and singly resolved sub-elements of a single pixel, it is possible to readily modulate the carrier signal between more than two phases, which is all that has been possible with prior art spatial light modulators with binary addressing.

The phase modulation of the preferred embodiment works by resolving the light from two or more sub-elements into a single element. For instance, if light incident on a pixel with two sub-elements, and a phase change of 0 radians is induced on a first sub-element, and of $\pi/2$ radians on a second sub-element, and if light reflected from both elements has the same amplitude, then the light reflected from both sub-elements will have a net phase change of $\pi/4$. Similarly if a phase change of $\pi$ radians is induced on a first sub-element, and of $\pi/2$ radians on a second sub-element, and if light reflected from both elements has the same amplitude, then the light reflected from both sub-elements will have a net phase change of $3\pi/4$.

Figure 2A:
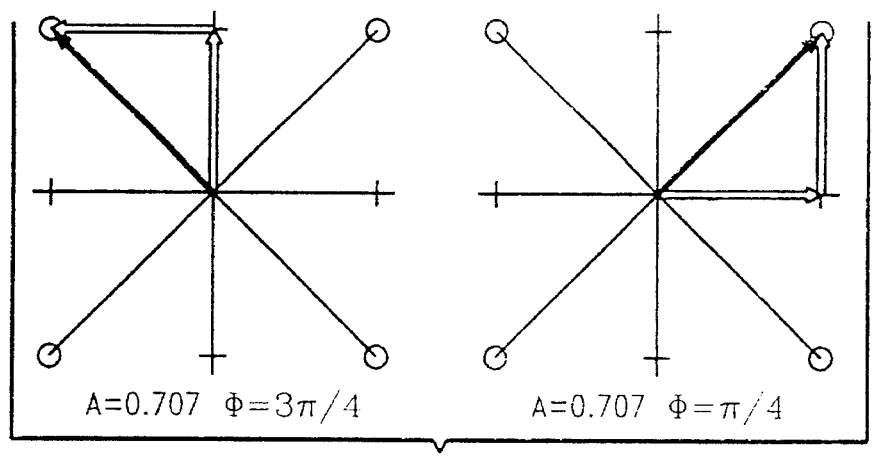
FIG. 2a–2b is the resulting phase diagram for the modulating device of FIG. 1.
Figure 2B:
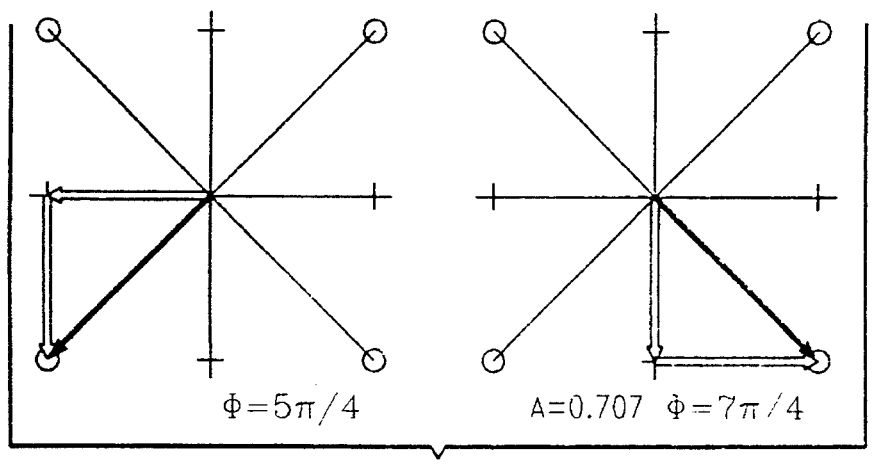

A preferred embodiment of the present invention is shown in FIG. 1. This embodiment consists of a pixel 20 consisting of one phase modulating element 22 that switches between zero and $\pi$ radians and a second modulating element 24 that switches between $\pi/2$ and $3\pi/2$ radians. With the optical system resolution set to mix the response of these two elements, the net response of the pixel will have the four possible phase states shown in FIG. 2a–2b, (e.g., $\pi/4$, $3\pi/4$, $5\pi/4$, and $7\pi/4$). The amplitude of the response at these phase states is $1/\sqrt{2}$ or 0.707 due to the addition of two equal components with a phase difference of $\pi/2$ radians (if the two halves were to be set to exactly the same phase the amplitude would sum to 1). Furthermore, since phase is a relative quantity, the phase measurements can be referenced to the $\pi/4$ state (i.e. the $\pi/4$ state may be called the zero phase state). Then, the four phase states of this modulating element can be called 0, $\pi/2$, $\pi$, and $3\pi/2$ radians.

Figure 3:
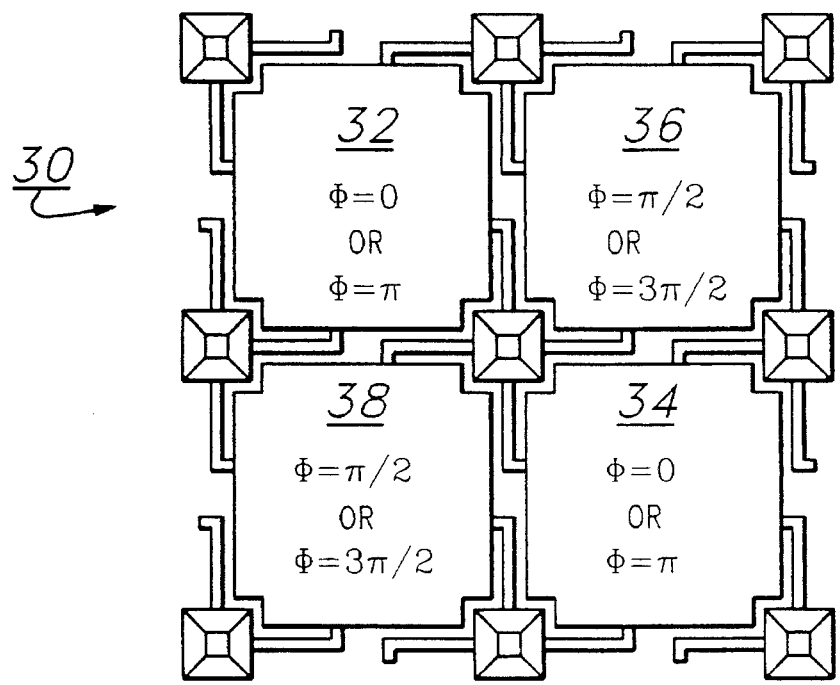
FIG. 3 is a plan view of a preferred embodiment four element MPSLM.
Figure 4:
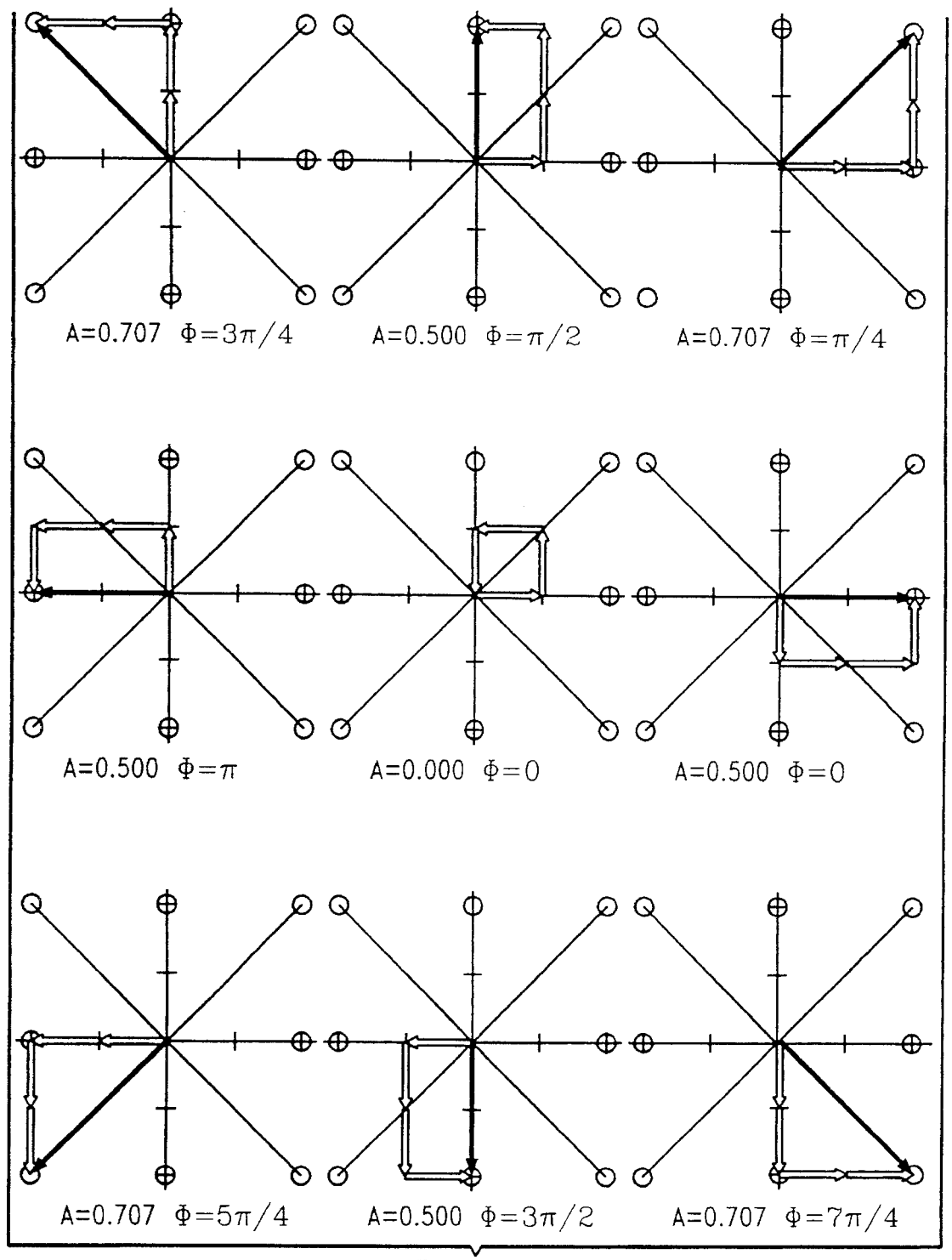
FIG. 4 is the resulting phase diagram for modulating device of FIG. 3.

Another embodiment of this invention is shown in FIG. 3. In this pixel 30 there are four independently addressable modulating elements. First and second elements 32, 34 switch between zero and $\pi$ radians. Third element 36 and a fourth element 38 switch between $\pi/2$ and $3\pi/2$ radians. Again setting the optical system resolution to mix the response of these elements into a single response, the different phase states shown in FIG. 4 can be achieved. One advantage of this pixel structure is its modulation characteristics as shown in FIG. 4. allows for eight different phase states each with approximately the same amplitude. The modulation characteristics further allow for a zero amplitude state. Still further, the layout of this pixel 30 is directly compatible with addressing circuitry that has been developed for display devices that utilize binary addressing circuitry. The regular square configuration of the modulating elements 32, 34, 36, and 38 can be added on to the existing binary addressing circuitry with no changes in the underlying address structures.

Figure 5:
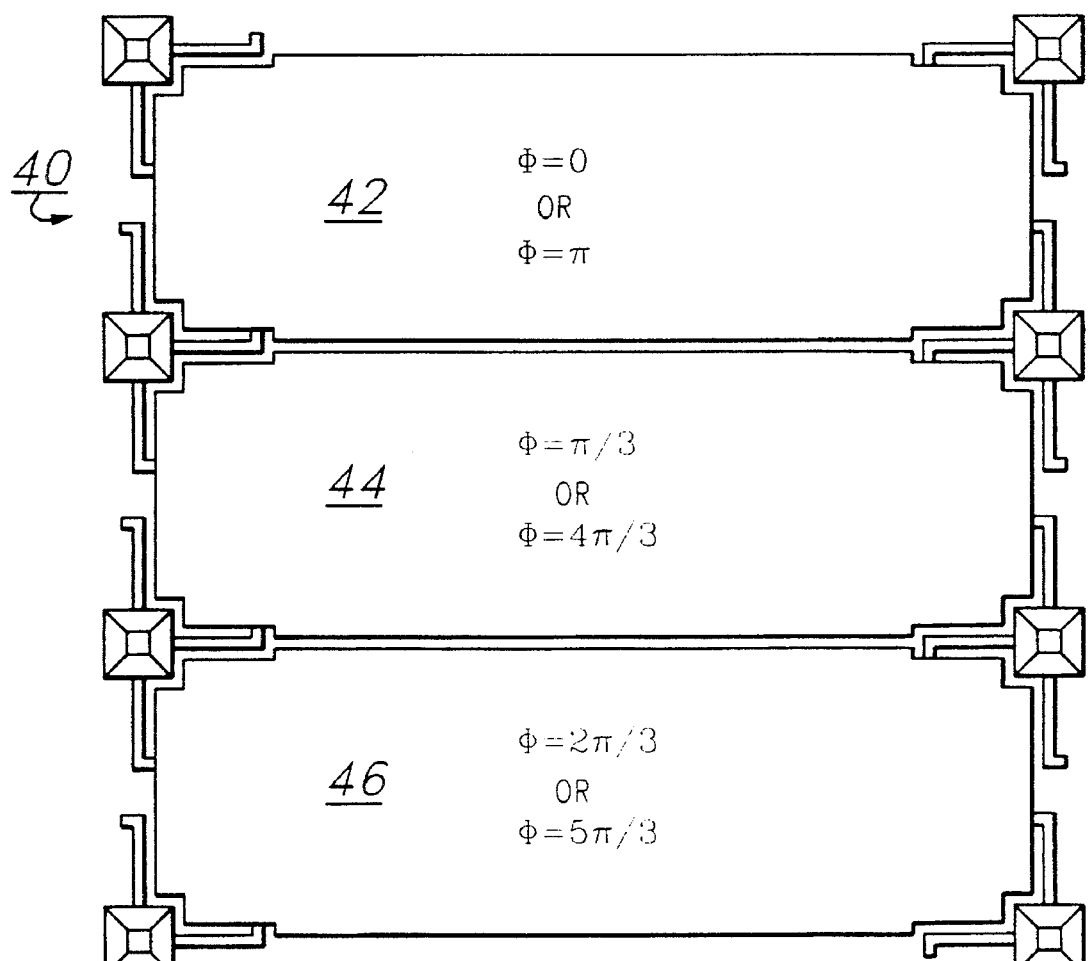
FIG. 5 is a plan view of a preferred embodiment three element MPSLM.
Figure 6:
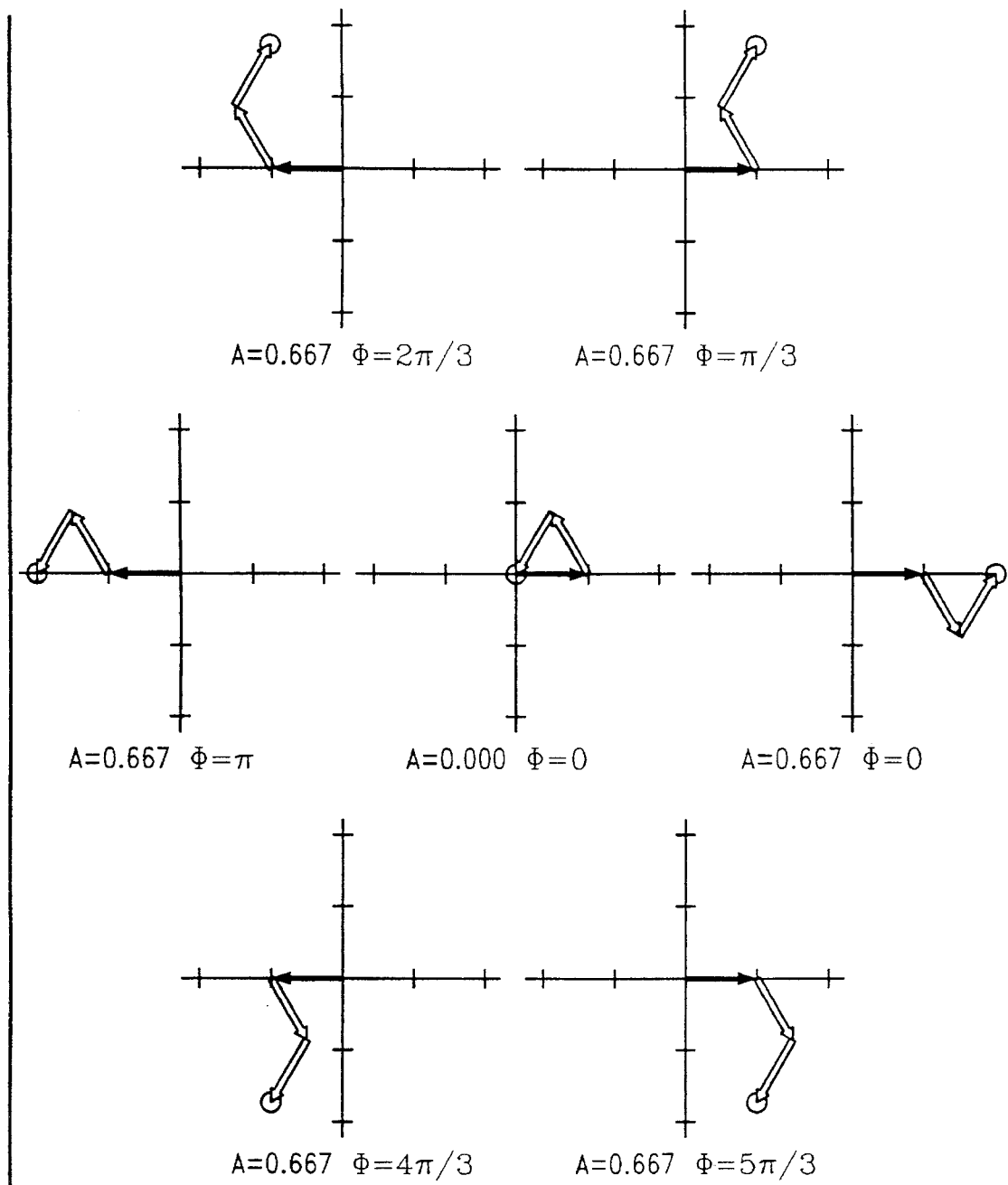
FIG. 6 is the resulting phase diagram for modulating device of FIG. 5.

The concept described can be extended to devices that switch between phase states that are not orthogonal. The embodiment shown in FIG. 5 is an example of this. This pixel 40 consists of three modulator elements, one pixel 42 switches between zero and $\pi$ radians, a second pixel 44 switches between $\pi/3$ and $4\pi/3$ radians, and a third pixel 46 switches between $2\pi/3$ and $5\pi/3$ radians. The combination of these elements when properly resolved gives the seven response states shown in FIG. 6. The modulation characteristics for this embodiment also have a zero amplitude state and all of the six phase states have exactly the same amplitude ($\frac{2}{3}$ of the response if all were of equal phase).

The preferred embodiment multiphase pixel is a deformable mirror light modulator. In alternate embodiments, pixels described above can be implemented in any type of light modulator that has the ability to switch between two phase states.

Figure 7:
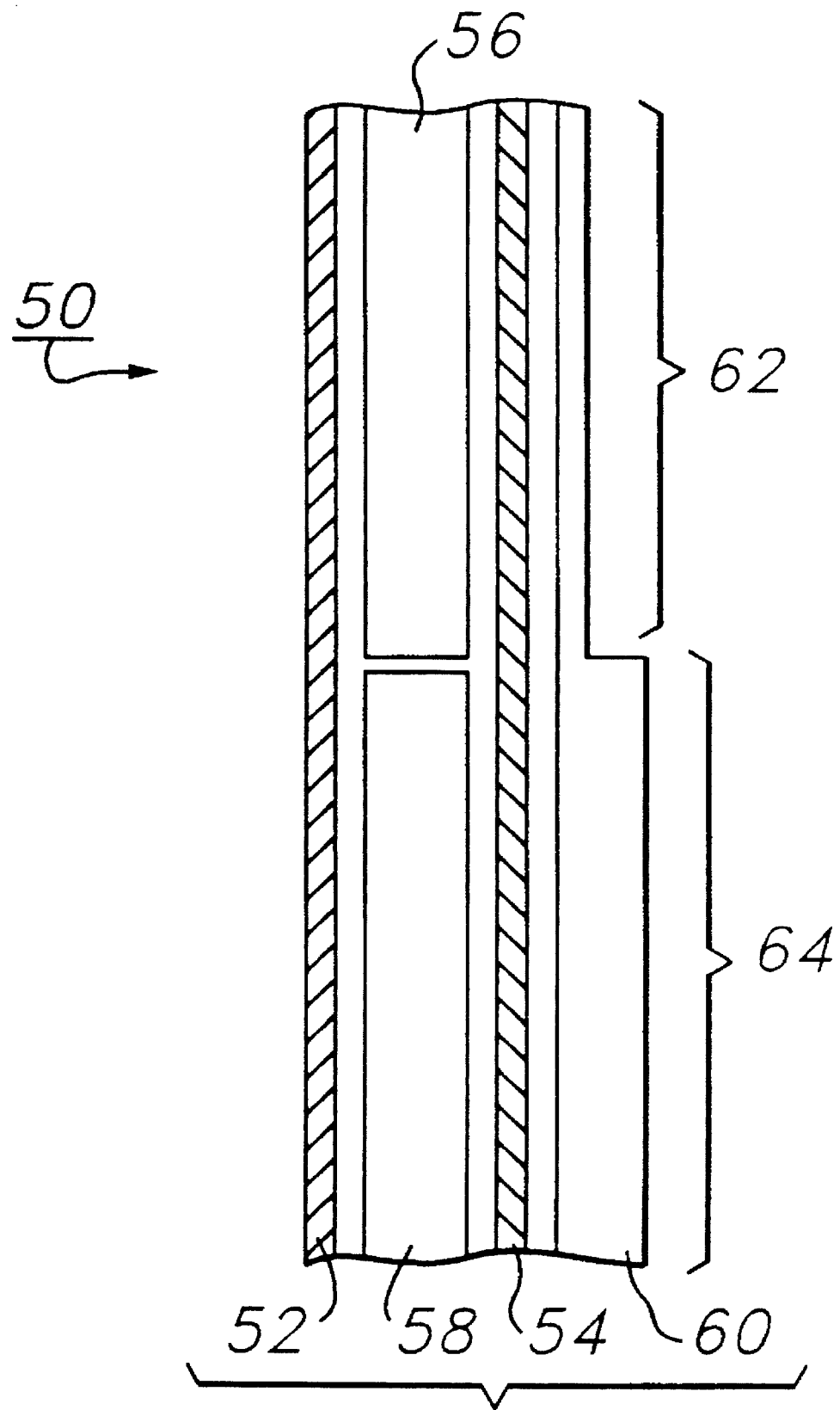
FIG. 7 is a plan view of an alternate embodiment two element MPSLM.

In many of the alternate embodiments, a mask must be placed over the modulator element array to introduce the necessary phase offsets so that adjacent elements switch between orthogonal phase states. The mask arrangement for polarization rotating light modulators such as magnetooptic devices or binary liquid crystal devices is shown in the device 50 of FIG. 7. In this arrangement, the active pixels 56 and 58 are interposed between the polarizer 52 and analyzer 54. The mask 60 is added after the analyzer 54. Section 62 comprises an area of mask 60 of a first selected thickness. Light passing through the first active pixel 56 and section 62 will have a reference phase. Section 64 comprises another area of mask of another selected thickness. Light passing through the second active pixel 58 and section 64 will introduce an additional phase change required to have second active pixel 58 operating between phase states that are orthogonal to those of the first active pixel. The mask 60 is added after the analyzer to ensure that the phase change does not change the operation of the polarizer/analyzer pair.

Figure 8:
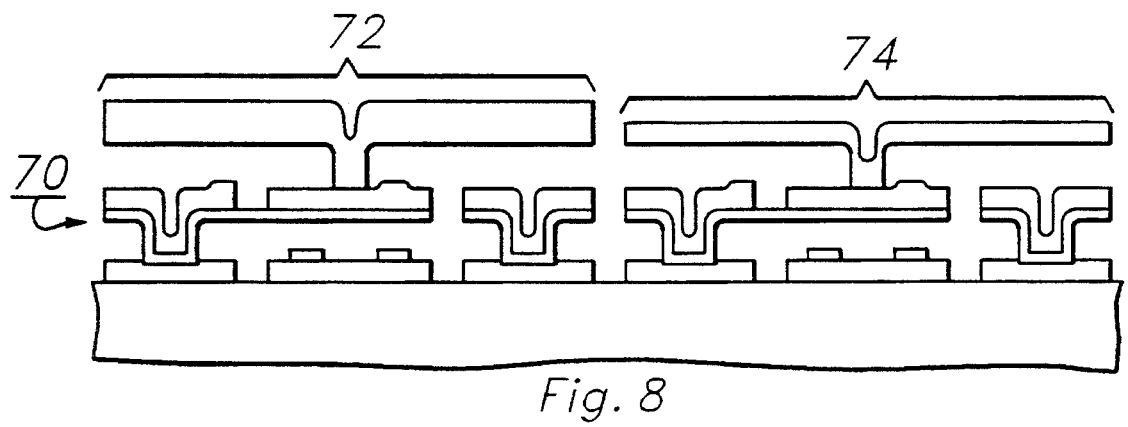
FIG. 8 is a view, in partial cross section, of the preferred embodiment MPSLM.

As outlined above the preferred embodiment multi-phase modulator pixel or macroelement is a subunit comprising two elements, a first element which can alternate in phase between zero and $\pi$ radians, and a second element which can vary between $\pi/2$ and $3\pi/2$ radians. FIG. 8 shows an implementation of this concept in a partial cross section of a single macroelement 70 within a Deformable Mirror Device (DMD). Each macroelement comprises a first mirror 72 and a second mirror 74. Each mirror is constrained to move vertically a distance corresponding to an odd multiple of $\pi/2$ radians of the phase of the incident illumination. The movement of each mirror is effected by applying a voltage between first or second element beam 104, 106 and an underlying address electrode 80. Beam element 104, 106 is connected to underlying bias circuitry through base pads 78, hinges 96, 98, and hinge supports 100, 102. A beam element 104 or 106 and an underlying address electrode 80 form the two plates of an air gap capacitor and the opposite charges induced on the two plates by the applied voltage exert electrostatic force attracting beam element 104 or 106 to an underlying address electrode 80. This causes beam element 104 or 106 to twist at associated hinges 96 or 98 (and possibly other hinges not shown) and be deflected toward underlying address electrode 80. The address voltage applied to beam element 104 or 106 is such that the beam element 104,106 deflects until it contacts underlying insulating stops 82. The motion of the beam elements 104, 106 is reflected in the mirror elements 72, 74 which are formed above the beam elements 104, 106. A deflected mirror 72, 74 will then cause an optical path change of $n\pi$ radians (where n is odd). The first mirror 72 is defined as zero radians when not deflected, and hence will vary in phase between zero and $n\pi$ radians (n odd). The second mirror 74 is built such that when the DMD is in its quiescent state, the surface of mirror 74 surface is displaced from the surface of the first mirror 72 by an odd multiple of $\pi/4$ radians, again so that the optical path difference between the two types of mirror is $m\pi/2$ radians (where m is odd).

The fabrication process can be extended to more than two mirrors per subpixel in order to make more phases accessible. For example, a three-mirror subpixel can be built if the three mirrors are constructed to move respectively between zero and $\pi/2$ radians, $\pi/6$ radians and $2\pi/3$ radians, and $\pi/3$ radians and $5\pi/6$ radians.

Fabrication of the Multiple Phase Spatial Light Modulator (MPSLM) begins with construction of the underlying CMOS circuitry. This can be the "standard" DRAM or SRAM array used in DMD projection display. For the MPSLM, however, the pixels can be thought of as grouped to form macropixels. This is an operational, rather than physical grouping. The physical array is identical to the DRAM or SRAM address array.

Address circuit fabrication may then be followed by a modified "Hidden Hinge DMD" process flow, as disclosed in U.S. Pat. No. 5,083,857, to build up the mirror substructure. The "Hidden Hinge DMD" process and structure is modified by adding a subsequent layer to an adjacent mirror element to introduce a phase change relative to an unmodified element. The "Hidden Hinge DMD" process flow is incorporated in the preferred embodiment of the present invention, although the present invention may be applied to many other methods and structures for light modulation.

Figure 9:
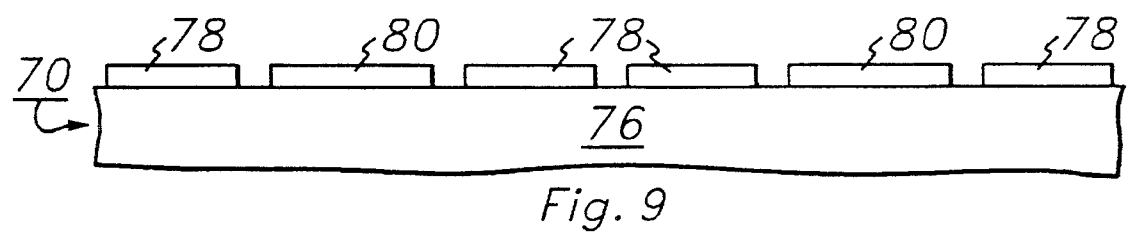
FIGS. 9–17 are partial cross section views of the preferred embodiment MPSLM after subsequent processing steps.

With reference to FIG. 9a, a substrate 76 is provided and a metal layer is formed and patterned to provide base pads 78 for support vias as well as address electrodes 80 which are in electrical communication with the underlying CMOS address circuitry. As mentioned above this underlying CMOS address circuitry can be similar to DRAM or SRAM address array.

Referring now to FIG. 9b, in order to control the travel of the mirrors 72 or 74 it is necessary to build a stop. The preferred method of fabrication would be to put one or more insulating stops 82 directly on the electrode 80 underlying the mirror 72 or 74. This step preferably comprises a low temperature a plasma oxide deposition (preferably less than 5000 Å). The stops 82 are then patterned and etched.

FIG. 9c shows the preferred embodiment DMD after a first spacer layer 84 is deposited and patterned. The first spacer layer 84 is spun on to planarize the electrode and stop topography. The thickness of the first spacer layer 84 is critical. The total spacer 84 thickness ($T_{sp}$) must be equal to the stop 82 height ($T_{st}$) plus an odd multiple of quarter wavelengths ($m\lambda/4$, m odd) of the incident illumination. In this manner beams 104 and 106 (not shown, see FIG. 9e) and the mirrors 72 and 74 (not shown, see FIG. 8) built upon beams 104 and 106 will deflect through a selected distance, L, left between the hinge elements 96, 98 (not shown, see FIG. 9e) and the top of the dielectric stop 82 by subsequent removal of the first spacer layer 84 ($L=m\lambda/4$, m odd=$T_{sp}-T_{st}$). Thus, the total first spacer layer 84 thickness ($T_{sp}$) is formed so the optical path length difference between light reflected from an nondeflected mirror and light reflected from the same mirror deflected through selected distance L ($L=m\lambda/4$, m odd) is $m\pi/2$ (m odd). In the preferred embodiment of the present invention, assume 6328 Å illumination. For a path length difference of $m\pi$ (m odd) between mirrors, the mirrors must be able to travel $m\lambda/4$ or 1582 Å, 4746 Å, 7910 Å, etc. In the preferred embodiment, m=3 is chosen for 4746 Å of deflection. Preferably, the first spacer layer thickness is 6200 Å, so oxide stops 82 will preferably be 1454 Å thick. The first spacer layer 84 is then patterned with hinge support via cavities 86 formed over the via pads 78 and UV hardened.

Referring now to FIG. 9d, the "Hidden hinge" substructure is now fabricated. Thin hinge aluminum alloy 88 is sputtered onto the first spacer layer 84 and low temperature plasma oxide is deposited onto the hinge aluminum 88 and patterned to form the buried hinge etch stop 90.

With reference to FIG. 9e, Beam aluminum is deposited, and another low temperature plasma oxide layer is deposited onto it and patterned to form a beam aluminum etch stop 94 in a similar manner to buried hinge etch stop 90. An aluminum etch is now performed clearing beam aluminum in areas not covered by beam aluminum etch stop 94 and hinge aluminum 88 not covered by the hinge aluminum etch stop 90. In this manner first element hinges 96 are formed, one or more second element hinges 98 are formed, one or more first element hinge supports 100 are formed, one or more second element hinge supports 102 are formed, a first element beam 104 is formed, and a second element beam 106 is formed. Further plasma etch is used to remove the oxide masks 90 and 94, and it must be selective against spacer etch. Unlike usual DMD process flows, first spacer layer 84 is not removed after the hidden hinge oxide strip.

Referring to FIG. 9f, a second spacer layer 108 is now spun on. Second spacer layer 108 must be of sufficient depth that when the mirrors 72 and 74 are deflected the mirror does not hit the hinge supports 102 and 104. In the preferred embodiment the mirror deflection distance is 4746 Å, so the preferred spacer thickness of 6200 Å will be sufficient. Mirror support via cavities 110 above beams 104, 106 are next patterned and UV-hardened.

Now referring to FIG. 9g, mirror aluminum 112 is deposited, and low temperature plasma oxide is deposited and etched to form the "hidden mirror" aluminum etch mask 114.

With reference to FIG. 9h, an additional layer of aluminum 116 is deposited which is will be responsible for the phase difference between the quiescent mirrors. The thickness of aluminum 116 shall preferably be equal to $n\lambda/8$ (n odd), so on reflection the path difference between the quiescent mirrors will be $n\lambda/4$. For the preferred incident light $\lambda=6328$ Å, this thickness can be 791 Å, 2373 Å, 3955 Å, 5537 Å, etc. Preferably, aluminum 116 thickness will be 2373 Å, for n=3. Oxide is again deposited and etched to form an aluminum etch mask 118 for the first mirror 72. All of the first mirror 72 aluminum is protected by the etch mask 118. The subsequent etch, preferably a plasma etch, will etch down to the oxide mask 114 over the second mirror 74, removing the extra $n\lambda/8$ of aluminum from the surface of the second mirror 74.

With reference to FIG. 9i, the semiconductor wafer (not shown) is then sawn and undercut as usual. The oxide masks 114 and 118 will be stripped and the spacer layers 84 and 108 will be removed, leaving two out of phase mirrors 72 and 74 supported by identical deformable substructures.

Figure 10:
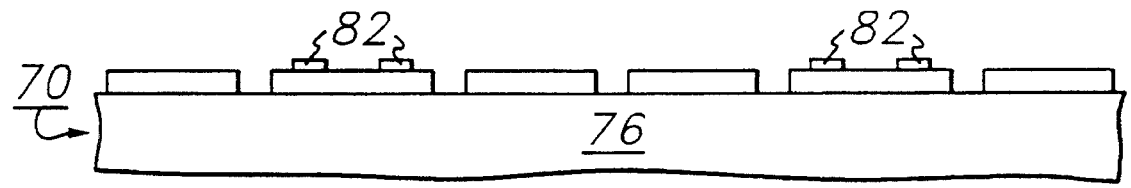

FIG. 10 shows a plan (top) view of the DMD macroelement 70. Showing the cross section through which FIG. 9a through 9i have been taken. Note that by using the hidden hinge structure, a great amount of surface area is actually the mirror elements 72 and 74. In this manner the "hidden hinge" structure is fairly efficient, modulating much of the incident optical energy.

Figure 11:
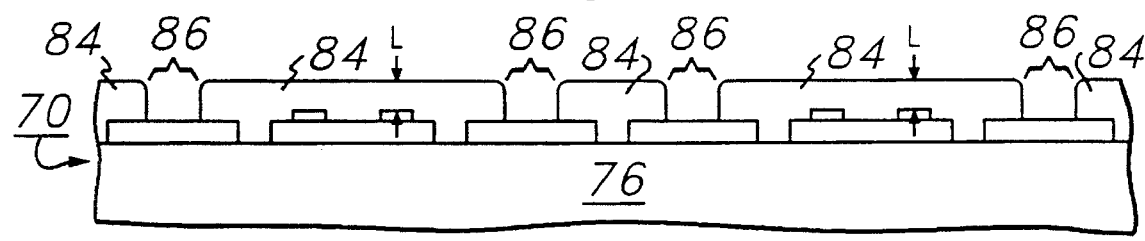

FIG. 11 shows a perspective view of the DMD macroelement 70.

Figure 12:
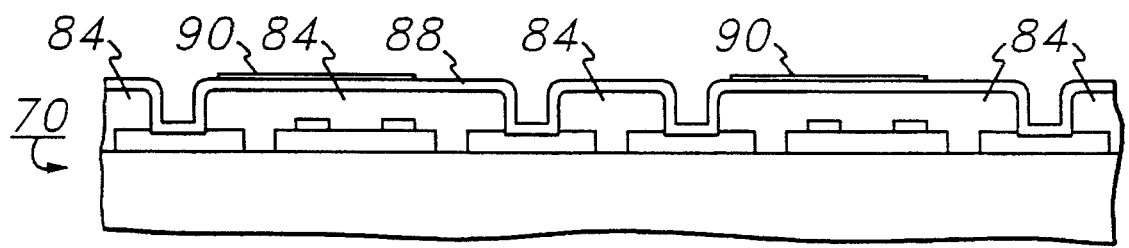
Figure 13:
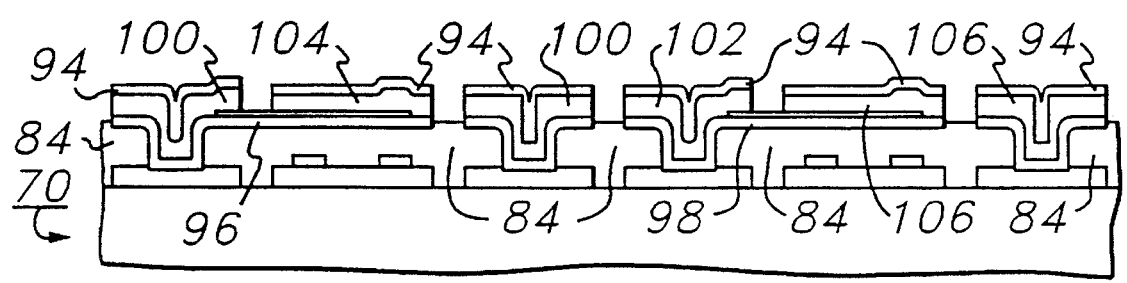
Figure 14:
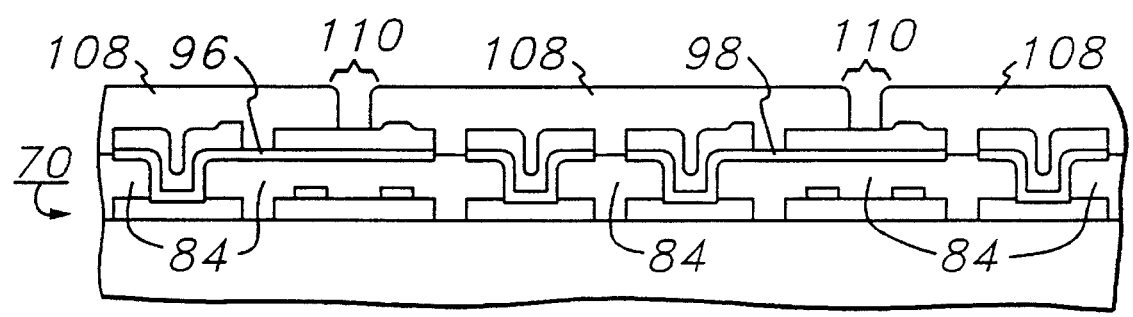
Figure 15:
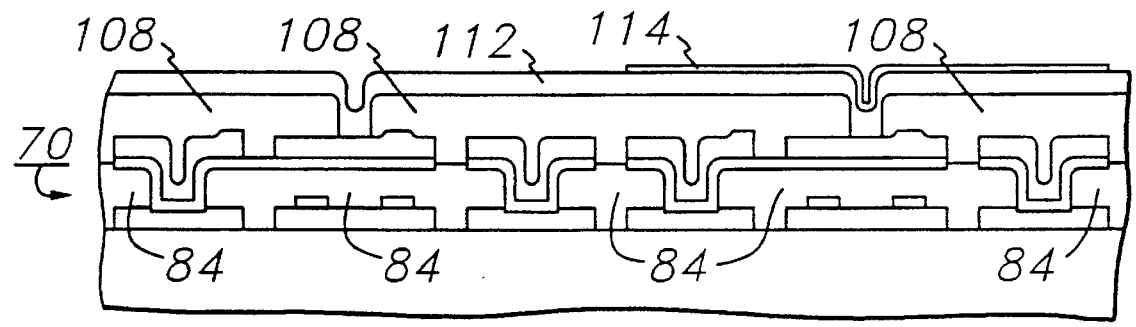
Figure 16:
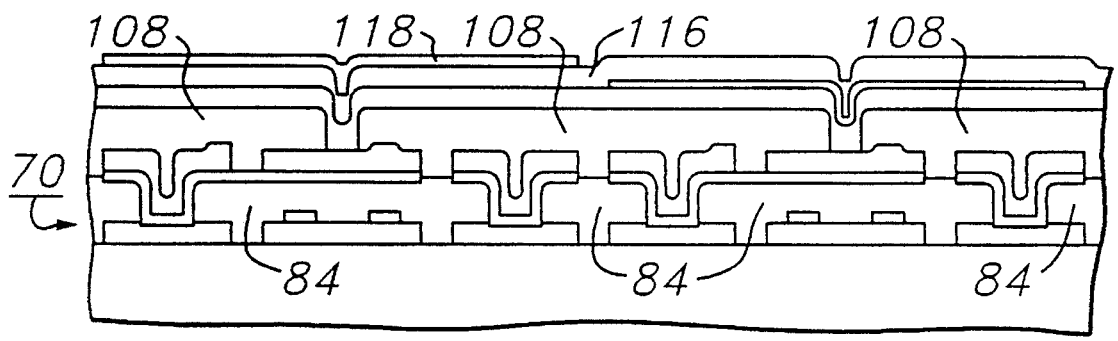
Figure 17:
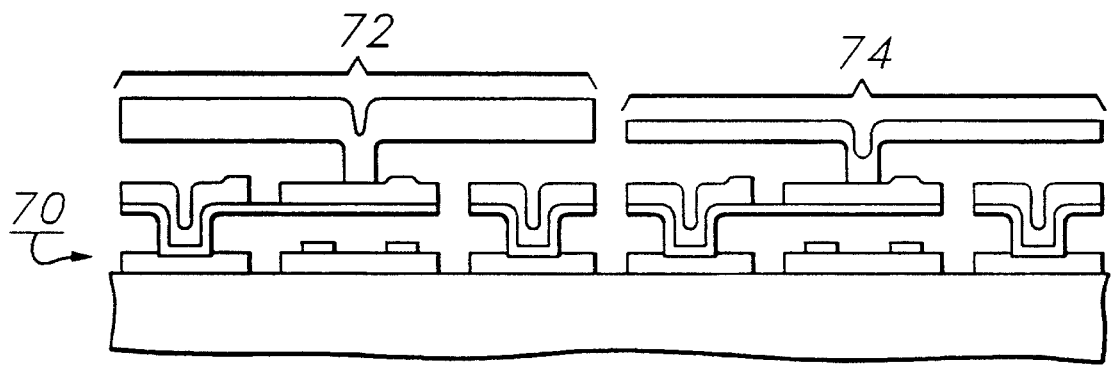
Figure 18:
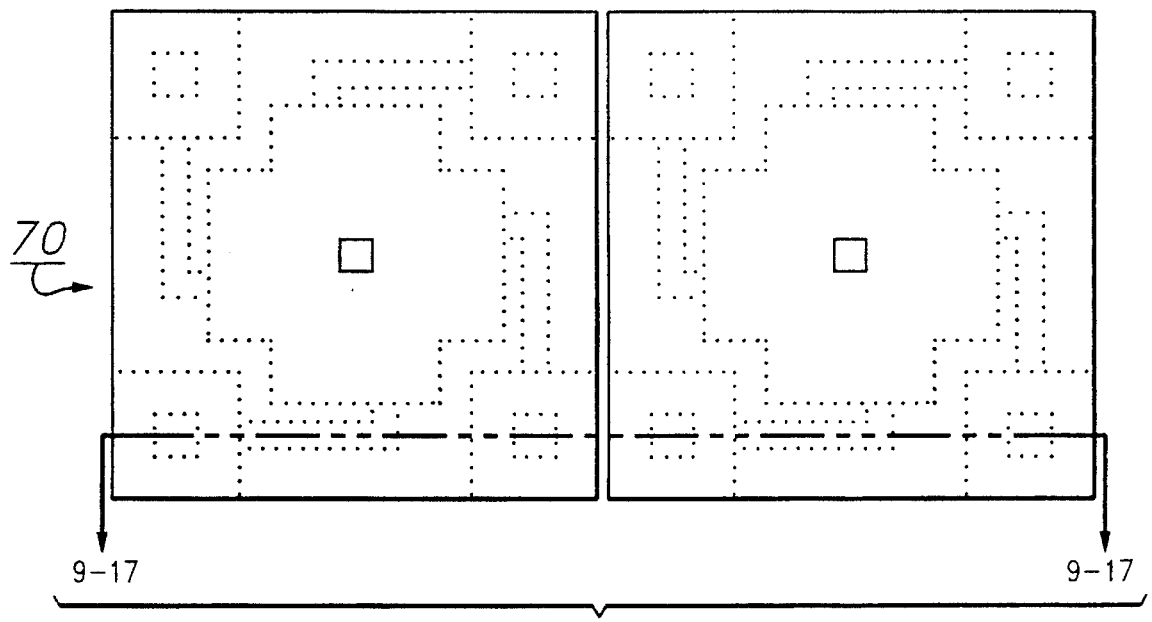
FIG. 18 is a plan view of the preferred embodiment MPSLM with phantom lines illustrating underlying "hidden hinge" and beam structure.
Figure 19:
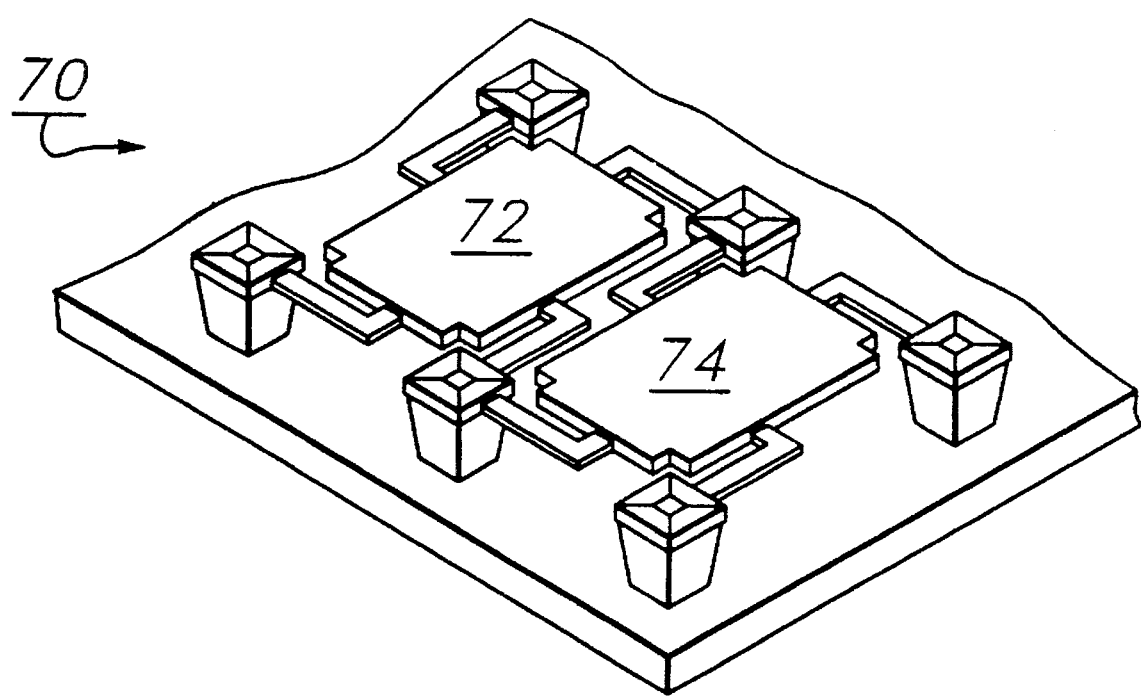
FIG. 19 is a perspective view of the preferred embodiment MPSLM.
Figure 20:
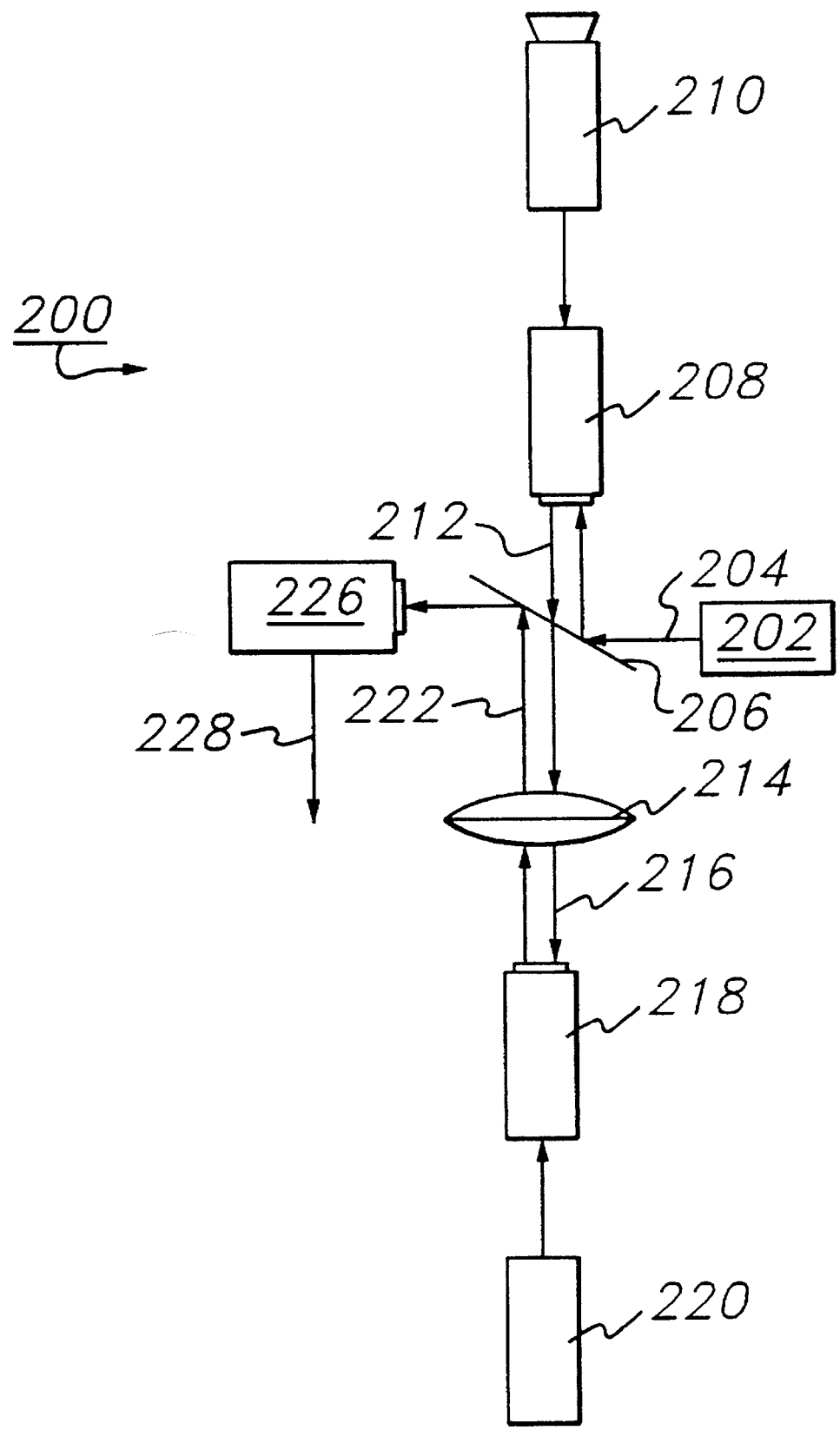
FIG. 20 is a block diagram of an optical signal processor incorporating an array of preferred embodiment MPSLM's.

FIG. 12 shows a block diagram of an optical signal processor 200 incorporating the preferred embodiment DMD. The preferred embodiment optical signal processor shown here is an optical correlator. The optical correlator's operation described below is exemplary. The DMD of this invention may be utilized in many types of structures. It is to be understood that the scope of the invention also comprehends embodiments different from those described, yet within the scope of the claims.

In the optical signal processor 200, a coherent light source 202 shines coherent light 204 upon an optical transmissive/reflective element 206. This optical element 206 substantially reflects the light from the light source 202 onto a first array 208 of preferred embodiment DMD's 70 (not shown, see FIG. 9). This first array 208 carries the input image placed on it by the input image sensor 210. This image is modulated onto the light signal 204 by the first array 208, and this modulated light 212 is directed towards optical element 206. Optical element 206 allows a substantial amount of modulated light 202 to pass through toward a lens 214. Lens 214 serves to perform a Fourier transform on the modulated light 212, as is well known in the art, resulting in a spatial frequency light signal 216 which is directed towards second array 218 of preferred embodiment DMD's 70 (not shown, see FIG. 9). This second array 218 carries a selected filter image placed on it by filter data base 220. Second array 218 modulated the spatial frequency light signal 216 with its filter image and directs the filtered signal 222 toward lens 214. Lens 214 serves to perform an inverse Fourier transform of filtered signal 222, as is well known in the art, resulting in an output correlation signal 224. This output correlation signal is now substantially reflected by optical element 206 and directed toward a CCD imager 226 which outputs an optical correlation map 228. Optical correlation map 228 shows the degree of correlation between the input image and the filter image and the location of the filter object in the input scene as is well known in the art. In the preferred embodiment light source 202 is a laser diode which outputs coherent light 204. Preferably, the optical element 206 operates to reflect light of one polarization, and transmit light of another polarization. The various light signals which pass through optical element 206 are imparted the needed polarization to either be reflected or transmitted by the optical element 206 as needed. Lens 214 may be a single or multiple lens system.

In the preferred embodiment DMD 70, mirror 72 and mirror 74 are deflected equal amounts. As an alternative these mirrors could have differing travels. Preferably, spacer layers 84, and 108 are completely removed subsequent to wafer sawing and undercut. In the alternative, these layers 84 and 104 may be removed at any time subsequent to beam 100 and 112 fabrication. In the preferred embodiment metal vias support the hinge/beam layers 96/100 and mirrors 72 and 74. As an alternative, photoresist spacer 84, 108 may be selectively etched to remain in these areas as support vias. The preferable metalizations comprise aluminum, although alternative metals such as titanium, gold, nickel or other metals or metal alloys can be used. The preferred fabrication method and structure is the "hidden hinge" process as disclosed in U.S. Pat. No. 5,083,857. Many other structures and methods for fabrication will be obvious to those skilled in the art upon examination of the specification and claims of this document. Stops 82 are described in the preferred embodiment as insulating stops, but any material may be used which provides the appropriate durability, as long as the device structure is such that electrical isolation is maintained regardless of mirror deflection. The underlying circuitry is preferably a DRAM or SRAM type structure, but a charge coupled device (CCD) or other type of circuitry could perform the function depending on the type of performance desired.

The preferred embodiment comprised a two-mirror macroelement. For a three mirror (or more) macroelement, the flow could be expanded as follows:

FIG. 9a through 9g proceed in the same fashion, except electrodes and hidden hinge substructure for a third mirror is included.

In FIG. 9h, for the three mirror device, the aluminum film 116 thickness must be modified so that the optical path difference on reflection between the first two mirrors is $m\pi/3$, where m=1, 4, 7, etc. That is, the film thickness must be $m\pi/6$ radians or $m\lambda/12$. In the preferred embodiment, for 6328 Å illumination, this corresponds to 527 Å, 2110 Å, 3692 Å, etc. In the preferred embodiment, an aluminum film 116 thickness of 2110 Å, for n=4 would be usable.

Further in FIG. 9h, an additional aluminum deposition and oxide mask deposition is required for the third mirror. These layers are formed in a similar fashion to aluminum film 116 and oxide mask 118. Preferably, the aluminum film would be 2110 Å, to put another $4\pi/3$ radians of reflected optical path difference between mirrors two and three.

The new process described associated with FIG. 9i will be identical to the previous description of 9i.

While the preferred embodiment has been described using binary addressing schemes, an alternative would be to bias the DMD to use the tristable operation of the DMD to gain a trinary addressing scheme capable of further phase states than would be possible using binary addressing.

A few preferred embodiments have been described in detail hereinabove. It is to be understood that the scope of the invention also comprehends embodiments different from those described, yet within the scope of the claims. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical signal processor operable to receive coherent light from a coherent light source, said optical signal processor comprising:

a. an optical transmissive/reflective element that is operable to receive said coherent light from said coherent light source and to substantially reflect said coherent light;

b. a first spatial light modulator operable to receive said coherent light from said transmissive/reflective element and to modulate an input image onto said coherent light to form a modulated light signal comprising said input image modulated upon said coherent light, said first spatial light modulator further operable to direct said light signal toward said transmissive reflective element, which allows a substantial amount of said modulated light signal to pass through it;

c. a first transformer operable to receive said modulated light signal and to perform a first domain transformation thereupon;

d. a second spatial light modulator operable to receive said transformed, modulated light signal and to modulate a filter image thereupon to form a filtered/transformed signal, said second spatial light modulator comprising i. a first modulating element switchable between at least two discrete, addressable states;

ii. a second modulating element, switchable between at least two discrete, addressable states, said second modulating element being adjacent to said first modulating element and formed such that said second modulating element will effect a phase difference between light incident thereon and light incident on and acted upon by said first modulating element, the responses from said first and second modulating elements being combinable into a single response having a phase state that is one of a plurality of discrete phase states that are dependent upon the addressed states of said first and second modulating elements; and e. a second transformer operable to receive said filtered/transformed signal and to perform a second domain transformation thereupon, said second domain transformation being the inverse of said first domain transformation, resulting in an output correlation signal.

2. The optical signal processor of claim 1 and further comprising an optical detector that is operable to receive said output correlation signal and provide an optical correlation map that shows the degree of correlation between the input image and the filter image.

3. The optical signal processor of claim 1 wherein said coherent light source is a laser diode.

4. The optical signal processor of claim 1 wherein said optical transmissive/reflective element operates to reflect light of one polarization, and transmit light of another polarization.

5. The optical signal processor of claim 4 and further comprising a polarizer interposed between the coherent light source and the optical transmissive/reflective element whereby the coherent light passing therethrough is imparted with the needed polarization to be reflected toward said first spatial light modulator by the transmissive/reflective element.

6. The optical signal processor of claim 1 wherein said optical transmissive/reflective element is comprised of a plurality of discrete reflective elements operable to direct light from said coherent light source to said first spatial light modulator to said first transformer and from said second spatial light modulator to said second transformer.

7. The optical signal processor of claim 1 wherein said spatial light modulators are deformable mirror devices.

8. An optical signal processor operable to receive coherent light from a coherent light source, said optical signal processor comprising:

a. an optical transmissive/reflective element that is operable to receive said coherent light from said coherent light source and to substantially reflect said coherent light;

b. a first deformable mirror device operable to receive said coherent light from said transmissive/reflective element and to modulate an input image onto said coherent light to form a modulated light signal comprising said input image modulated upon said coherent light, said first spatial light modulator further operable to direct said light signal toward said transmissive reflective element, which allows a substantial amount of said modulated light signal to pass through it;

c. a first lens operable to receive said modulated light signal and to perform a first domain transformation thereupon;

d. a second deformable mirror device operable to receive said transformed, modulated light signal and to modulate a filter image thereupon to form a filtered/transformed signal, said second deformable mirror device comprising i. a first deformable mirror switchable between at least two discrete, addressable states;

ii. a second deformable mirror switchable between at least two discrete, addressable states, said second deformable mirror being adjacent to said first deformable mirror and formed such that said second deformable mirror will effect a phase difference between light incident thereon and light incident on and acted upon by said first deformable mirror, the responses from said first and second deformable mirrors being combinable into a single response having a phase state that is one of a plurality of discrete phase states that are dependent upon the addressed states of said first and second deformable mirrors; and e. a second lens operable to receive said filtered/transformed signal and to perform a second domain transformation thereupon, said second domain transformation being the inverse of said first domain transformation, resulting in an output correlation signal.

9. The optical signal processor of claim 8 and further comprising an optical detector that is operable to receive said output correlation signal and provide an optical correlation map that shows the degree of correlation between the input image and the filter image.

10. The optical signal processor of claim 8 wherein said optical transmissive/reflective element operates to reflect light of one polarization, and transmit light of another polarization.

11. The optical signal processor of claim 8 and further comprising a polarizer interposed between the coherent light source and the optical transmissive/reflective element whereby the coherent light passing therethrough is imparted with the needed polarization to be reflected toward said first deformable mirror device by the transmissive/reflective element.

12. The optical signal processor of claim 8 wherein said optical transmissive/reflective element is comprised of a plurality of discrete reflective elements operable to direct light from said coherent light source to said first spatial light modulator to said first transformer and from said second spatial light modulator to said second transformer.

* * * * *